United States Patent
Koufaty et al.

(10) Patent No.: US 11,921,646 B2
(45) Date of Patent: Mar. 5, 2024

(54) SECURE ADDRESS TRANSLATION SERVICES USING A PERMISSION TABLE

(71) Applicant: Intel Corporation, Santa Clara, CA (US)

(72) Inventors: David Koufaty, Portland, OR (US); Rajesh Sankaran, Portland, OR (US); Anna Trikalinou, Hillsboro, OR (US); Rupin Vakharwala, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/842,094

(22) Filed: Jun. 16, 2022

(65) Prior Publication Data

US 2022/0309008 A1  Sep. 29, 2022

Related U.S. Application Data

(63) Continuation of application No. 16/582,956, filed on Sep. 25, 2019, now Pat. No. 11,392,511.

(51) Int. Cl.
*G06F 12/14* (2006.01)
*G06F 12/0862* (2016.01)
(Continued)

(52) U.S. Cl.
CPC ...... *G06F 12/1483* (2013.01); *G06F 12/0862* (2013.01); *G06F 12/1009* (2013.01);
(Continued)

(58) Field of Classification Search
None
See application file for complete search history.

(56) References Cited

U.S. PATENT DOCUMENTS

2013/0080726 A1* 3/2013 Kegel ............... G06F 21/85
  711/163
2018/0232320 A1* 8/2018 Raval ............... G06F 12/1081
(Continued)

OTHER PUBLICATIONS

Corrected Notice of Allowability for U.S. Appl. No. 16/582,956 dated May 2, 2022, 4 pages.
(Continued)

*Primary Examiner* — Brian R Peugh
(74) *Attorney, Agent, or Firm* — Jaffery Watson Mendonsa & Hamilton LLP

(57) ABSTRACT

Embodiments are directed to providing a secure address translation service. An embodiment of a system includes memory for storage of data, an IOMMU coupled to the memory, and a host-to-device link to couple the IOMMU with one or more devices and to operate as a translation agent on behalf of one or more devices in connection with memory operations relating to the memory, including receiving a translated request from a discrete device via the host-to-device link specifying a memory operation and a physical address within the memory pertaining to the memory operation, determining page access permissions assigned to a context of the discrete device for a physical page of the memory within which the physical address resides, allowing the memory operation to proceed when the page access permissions permit the memory operation, and blocking the memory operation when the page access permissions do not permit the memory operation.

18 Claims, 9 Drawing Sheets

(51) Int. Cl.
*G06F 12/1009* (2016.01)
*G06F 13/16* (2006.01)
*G06F 13/42* (2006.01)

(52) U.S. Cl.
CPC ...... *G06F 13/1668* (2013.01); *G06F 13/4282* (2013.01); *G06F 2212/1052* (2013.01); *G06F 2212/305* (2013.01); *G06F 2212/6028* (2013.01); *G06F 2213/0026* (2013.01)

(56) References Cited

U.S. PATENT DOCUMENTS

| | | | |
|---|---|---|---|
| 2019/0018800 A1* | 1/2019 | Jayasena | G06F 9/5077 |
| 2019/0243780 A1* | 8/2019 | Gopal | G06F 12/0811 |
| 2020/0065255 A1* | 2/2020 | Lebeane | G06F 12/1009 |

OTHER PUBLICATIONS

Final Office Action for U.S. Appl. No. 16/582,956 dated Mar. 8, 2022, 15 pages.
Non-Final Office Action for U.S. Appl. No. 16/582,956 dated Sep. 3, 2021, 14 pages.
Notice of Allowance for U.S. Appl. No. 16/582,956 dated Mar. 30, 2022, 7 pages.

* cited by examiner

| Level 311 | Page Size 312 | Table Size 313 | Entry Size 314 | Entries 315 | Index Bits 316 | Offset Bits 317 | Coverage 318 |
|---|---|---|---|---|---|---|---|
| L1 | 4KB | 4KB | 4b | 8K | 24:12 | N/A | 32MB |
| L2 | 2MB | 4KB | 128b | 256 | 32:25 | 24:21 | 8GB |
| L3 | 1GB | 4KB | 128b | 256 | 40:33 | 32:30 | 2TB |
| L4 | N/A | Up to 32KB | 128b | Up to 2048 | Up to 51:41 | N/A | Up to 4PB |

SECURE ADDRESS TRANSLATION SERVICES USING A PERMISSION TABLE

CROSS REFERENCE TO RELATED APPLICATIONS

This patent application is a continuation of U.S. patent application Ser. No. 16/582,956, filed Sep. 25, 2019, which is hereby incorporated by reference in its entirety for all purposes.

TECHNICAL FIELD

Embodiments described herein generally relate to the field of memory address translation and memory protection and, more particularly to a translation agent (e.g., an input/output memory management unit (IOMMU)) providing a secure address translation service based on a context of a requesting device.

BACKGROUND

Most modern computer systems use memory virtualization for optimal memory usage and security. Traditionally, Peripheral Component Interconnect Express (PCIe) devices would only observe untranslated addresses instead of a Host Physical Addresses (HPA), and would send a read or write request with a given untranslated address. On the host side, the processor's IOMMU would receive a read/write request from a device, translate the specified address to an HPA and complete the device's memory access (read/write). In order to isolate devices only to specific addresses, software would program the device and the IOMMU to use untranslated address that are, for example, a Virtual Addresses (VA) or an Input/Output Virtual Address (IOVA). The HPA is the physical address used to access all platform resources, after all address translations have taken place, including any translation from Guest Physical Address (GPA) to HPA in a virtualized environment, and it is usually referred simply as a Physical Address (PA) in a non-virtualized environment.

Address Translation Services (ATS) is an extension to the PCIe protocol. The current version of ATS is part of the PCIe specification, currently 4.0, which is maintained by the PCI Special Interest Group (PCI-SIG) and which can be accessed by members at https://pcisig.com/specifications/ may be referred to herein as the "ATS Specification." ATS among other things, allows devices to cache address translations and to handle page faults (traditional PCIe devices required memory pinning), which facilitates support for a variety of performance features, including Device Translation Lookaside Buffer (Dev-TLB) and Shared Virtual Memory. ATS also provides support for cache-coherent links like Computer Express Link (CXL) that operate exclusively on physical address. ATS allows a PCIe device to request address translations, from VA to HPA, from a translation agent (e.g., the IOMMU). This capability allows the device to store the resulting translations internally in a Dev-TLB, also referred to by the ATS Specification as an address translation cache (ATC), and directly use the resulting HPA to subsequently access main memory, via a host-to-device link (e.g., a PCIe interface or a cache-coherent interface (e.g., CXL, NVLink, and Cache Coherent Interconnect for Accelerators (CCIX)). As such, ATS splits a legacy PCIe memory access into multiple stages, including (i) a Translation Request in which the device requests a translation for a VA to a HPA; (ii) a Translated Request in which the device requests a read/write with a given HPA; and (iii) an optional Page Request in which the device makes a request to the IOMMU for a new page to be allocated for it after a failed Translation Request.

At present, ATS performs limited security checks on translation requests and translated requests, but these checks are insufficient to protect against a malicious ATS device.

BRIEF DESCRIPTION OF THE DRAWINGS

Embodiments described here are illustrated by way of example, and not by way of limitation, in the figures of the accompanying drawings in which like reference numerals refer to similar elements.

FIG. 3 is a table illustrating various characteristics of levels of a multi-level HPT in accordance with an embodiment.

DETAILED DESCRIPTION

Figure 1:
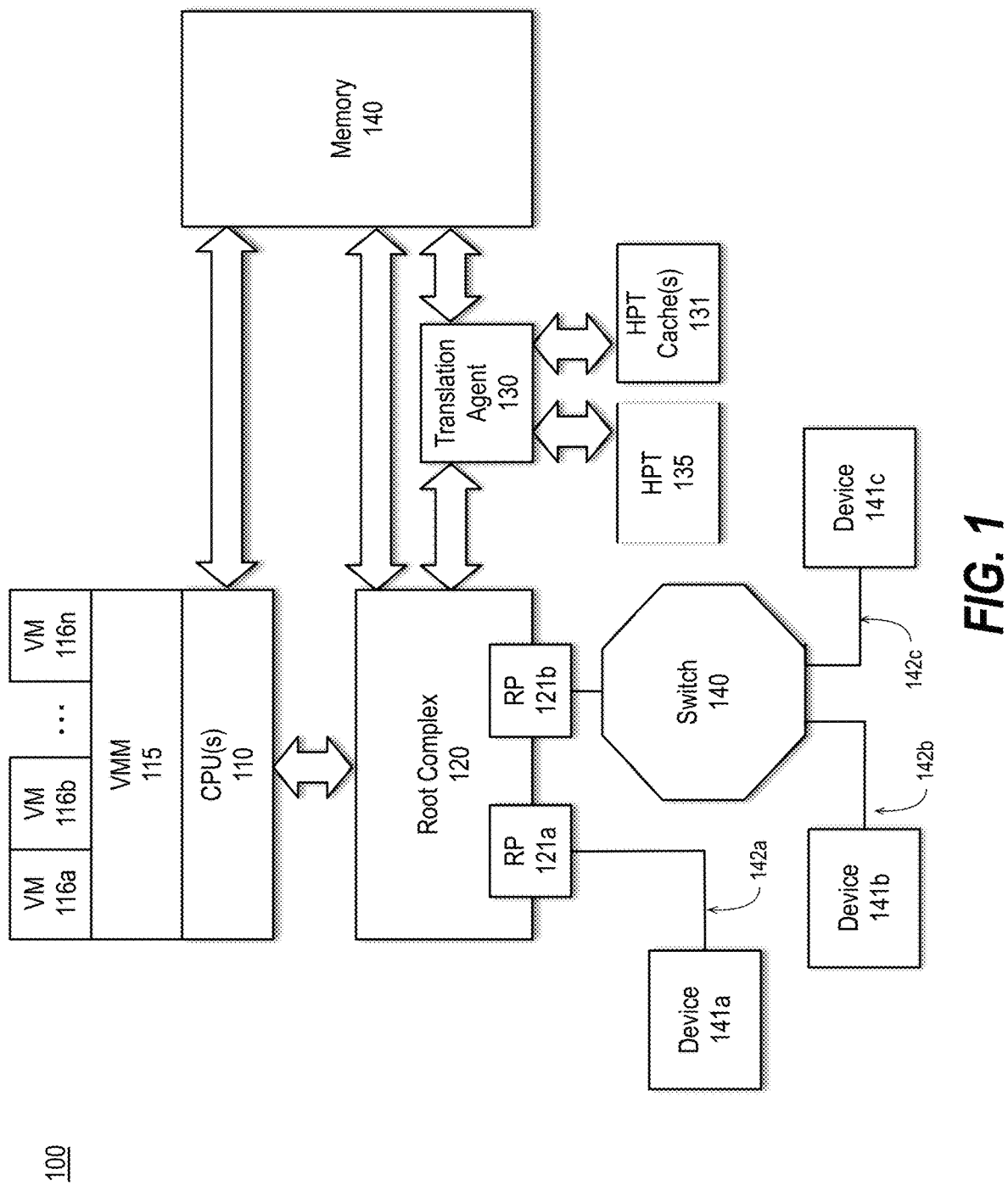
FIG. 1 is a block diagram illustrating a computing system architecture including a host system and associated integrated and/or discrete devices in accordance with an embodiment.

Embodiments described herein are directed to providing a secure address translation service by a translation agent based on a context of a requesting device.

The ATS Specification provides checks on every ATS Translated Request with an HPA to verify (i) the device that sent the memory access request is enabled by the system software to use ATS; and (ii) the HPA is not part of a system protected range (e.g., an Intel® Software Guard Extensions (SGX) Protected Memory Range (PRMRR) region). While these checks allow the system software to check the device manufacturer of the device before allowing a requested memory operation and to verify that highly-sensitive system regions are protected from an ATS device, all other memory (e.g., ring-1, ring 0, ring 3 code/data) remains vulnerable and without device authentication, device manufacturer information can be easily forged by an attacker. In addition, device authentication cannot guarantee the proper behavior of a device (e.g., a Field Programmable Gate Array (FPGA)) with reconfigurable hardware logic. Therefore, those skilled in the art will recognize the current ATS definition has a security vulnerability. Specifically, a malicious ATS device can send a Translated Request with an arbitrary HPA and perform a read/write to that HPA, without first asking for a translation or permission from the trusted system, such as the IOMMU.

Another layer of protection provided by modern processors may include an architecture and instruction set architecture (ISA) extensions, which includes per-domain encryption keys. A domain can be a Virtual Machine (VM) running inside a Virtual Machine Monitor (VMM). However, if ATS is enabled, a malicious ATS device that is not trusted by any domain, can still write to any HPA with the wrong key, which can result in memory corruption and/or be used as part of a Denial of Service attack on a domain. Meanwhile, if the domain chooses to disable ATS for a particular device, then that particular device would be incompatible with cache-coherent links and would be incompatible with other host performance features like Shared Virtual Memory and VMM Overcommit. As such, without the improvements described herein, software vendors would be faced with a choice between performance and security.

Embodiments described herein generally seek to provide an access control mechanism, so that a device can only access HPAs that were explicitly assigned to a context of the device initiating a memory operation at issue. For example, a host permission table (HPT) can be configured (at a desired level of granularity) by trusted system software to allow access to certain HPAs and enforced by hardware (e.g., the IOMMU).

In some embodiments, access permissions for a translated request can be verified by a translation agent of a host system prior to allowing a memory operation to proceed. Responsive to receipt by the translation agent of translated request from a device via a host-to-device link, the translation agent determines page access permissions assigned to a context of the device for a physical page of the memory within which a physical address specified by the translated request resides. When the page access permissions permit the memory operation, then the translation agent allows the memory operation to proceed; however, when the page access permissions do not permit the memory operation, then the translation agent blocks the memory operation.

In some embodiments, page permission entries of a host permission table (HPT) can be prefetched. For example, a translation agent of a host system may maintain on behalf of system software and make use of or otherwise consult an HPT during translation request processing and/or translated request processing that associates a page permission entry containing page access permissions with each physical page of multiple physical pages in a memory of the host system and each of multiple contexts of multiple devices coupled to the host system. Responsive to receipt by the translation agent of a translation request from a device via a host-to-device link, the translation agent may translate a virtual address specified by the translation request address to a physical address within the memory and use the translation request as a hint that the device will soon request a memory operation involving the physical address to avoid a future HPT cache miss. For example, responsive to the translation request the translation agent may proactively retrieve a page permission entry or a portion thereof (e.g., the page access permissions) from the HPT for the context of the device and a physical page in which the physical address resides and proactively store it within an HPT cache as discussed further below.

In some embodiments, the translation agent facilitates dynamic building of the HPT permissions by system software. For example, the translation agent of a host system maintains on behalf of system software and makes use of or otherwise consults during translation request processing and/or translated request processing a host permission table (HPT) that associates a page permission entry containing page access permissions with each physical page of multiple physical pages in a memory of the host system and each of multiple contexts of multiple devices coupled to the host system. Responsive to receipt by the translation agent of a translation request from a device via a host-to-device link, the translation agent facilitates dynamic building of the HPT by system software of the host system by: (i) proactively retrieving page access permissions from the HPT for the context of the device and a physical page in which a physical address specified by the translation agent resides and storing it within the HPT cache; (ii) proactively retrieving address translation page table permissions for the context of the device corresponding to the physical page; and (iii) communicating to the device the least possible privileged represented by the combination of the retrieved page access permissions from the HPT and the retrieved address translation page table permissions from the address translation.

Overview

A goal of some embodiments is to ensure that a device will only be able to read/write memory (on behalf of a bus, a port, a process, a function or itself) to which the system software has explicitly granted access. Various embodiments described herein are based on adding a new permission table, referred to as a Host Permission Table (HPT), which may be used by a translation agent to validate device requests to translate a VA to an HPA. In order to be consistent with the ATS Specification, these upstream requests initiated by a context of a device may be referred to individually herein as a "translation request." Similarly, an upstream request initiated by a context of a device to perform a memory operation with reference to a specified HPA may be referred to herein as a "translated request." As used herein the phrases a "context of" or "context on" a device generally refers to a bus to which the device is coupled, a process executing on the device, a function or virtual function being executed by the device or the device itself. While for sake of simplicity various examples and embodiments are discussed herein with reference to an HPT containing page access permissions at the resolution of a device, as discussed further below, in alternative embodiments depending on how coarse or fine a level of access control is desired for a particular implementation, the HPT may be configured to store page access permissions on a per-bus, per-device, per-port, per-function, or per-process basis.

At a high level, the HPT associates a permission entry with each physical page, including main memory (e.g., Dynamic Random Access Memory (DRAM)) and each device (or context of a device). In some embodiments, the permission entry includes at least page access permissions indicating whether the context of the device is permitted to read the page to which the permission entry corresponds and indicating whether the context of the device is permitted to write the page. Each time a translated request from a device is received by the translation agent to access an HPA, via a translated request, the corresponding page access permissions in the HPT (or in an optional HPT cache) is checked to verify that the given device has the necessary permissions to complete the memory access request. Similarly, device accesses to host memory via a coherent link, such as CXL, can also be checked to verify that the necessary permissions are present.

FIG. 1 is a block diagram illustrating a computing system architecture 100 including a host system and associated integrated and/or discrete devices 141a-c in accordance with an embodiment. In the context of the present example, the host system includes one or more central processing units (CPUs) 110, a root complex (RC) 120 and a memory 140. Similar to a host bridge in a PCI system, the RC 120 generates transaction requests on behalf of the CPUs 110, which are coupled to the RC 120 through a local bus and facilitates processing of requests by devices 141a-c, which are coupled to the RC 120 via respective host-to-device links 142a-c, and root port (RP) 121a or switch 140 and RP 121b. Depending on the particular implementation, RC functionality may be implemented as a discrete device, or may be integrated with a processor.

ATS uses a request-completion protocol between devices 141a-c and the RC 120 to provide translation services. Non-limiting examples of devices 141a-c include a network interface card (NIC), a graphics processing unit (GPU), a storage controller, an audio card, and a solid-state drive (SSD) in the form of a peripheral (auxiliary) device or an integrated device. The basic flow of an ATS request (e.g., a translation request or a translated request) begins with a context (e.g., a process or a function) of a device (e.g., one of devices 141a-c) determining through an implementation-specific method that caching a translation within the device's address translation cache (ATC) (not shown), for example, would be beneficial. The context (not shown) generates a translation request, which is sent upstream through the PCIe hierarchy (via host-to-device link 142b or 142c, switch 140, and RP 121b or via host-to device link 142a and RP 121a, depending upon the device 141a-c with which the context is associated) to the RC 120, which then forwards the request to translation agent 130. Non-limiting examples of host-to-device link 142a-c include a PCIe link or a cache-coherent link (e.g., CXL) that includes PCIe capabilities. When the translation agent 130 has completed processing associated with the ATS request, the translation agent 130 communicates the success or failure of the request to the RC 120, which generates an ATS completion and transmits it to the requesting device via the associated RP 121a or 121b.

As noted above, in accordance with the ATS Specification, translation agents perform various checks to among other things, validate the requesting device has been enabled by the system software to use ATS and that the HPA specified by a translated request is not part of a system protected range. In addition to these checks, which are insufficient to protect against a malicious ATS device, in various embodiments, the translation agent 130 provides an access control mechanism that ensures a context of a device can only access HPAs to which it has explicitly been assigned appropriate permissions.

In one embodiment, system software (e.g., the operating system (not shown), virtual machine manager (WM) 115 and/or virtual machines 116a-n) running on the host system can configure permissions (e.g., read and/or write access) for each page of memory 140 individually for each of devices 141a-c. These permissions (may be referred to herein as page access permissions, page permissions, HPT page access permissions and/or HPT page permissions) may be maintained on behalf of system software by the translation agent 130 in an HPT 135. The HPT 135 or portions thereof may be stored in a variety of locations including, but not limited to on-chip memory (e.g., static random access memory (SRAM)), off-chip memory (e.g., DRAM), registers or an external storage device (not shown).

Depending upon the particular implementation, the HPT 135 could be represented as a flat table in memory 140 in which for every device associated with the host system that is desired to use secure ATS and for each page in main memory a corresponding permission entry containing page access permissions specifying appropriate read/write permissions can be created. Alternatively, in order to avoid pre-allocating a large memory space and take advantage of the small size of the permission entries, the HPT 135 can be organized as a hierarchical table (similar to how address translation page tables are organized) as described further below. In any implementations in which the HPT 135 is stored off-chip, one or more optional, dedicated HPT caches 131 may be used to accelerate walking of the various levels of the HPT 135.

Figure 9:
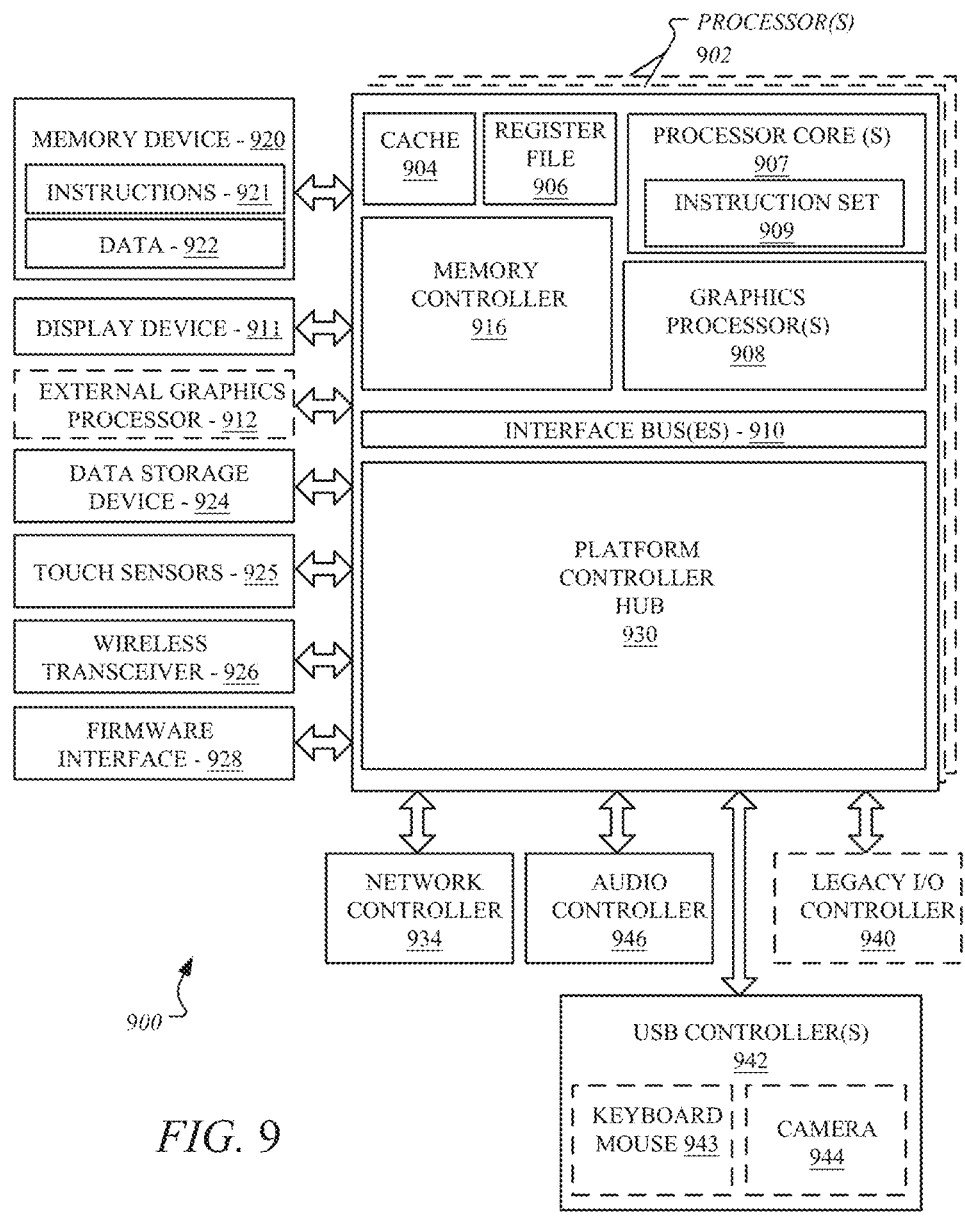
FIG. 9 is a block diagram illustrating a computing architecture which may be adapted to implement a secure address translation service using a permission table and based on a context of a requesting device in accordance with some examples.

The computing system architecture 100 may include additional components as provided in the computing system 900 illustrated in FIG. 9.

HPT Walk

Figure 2:
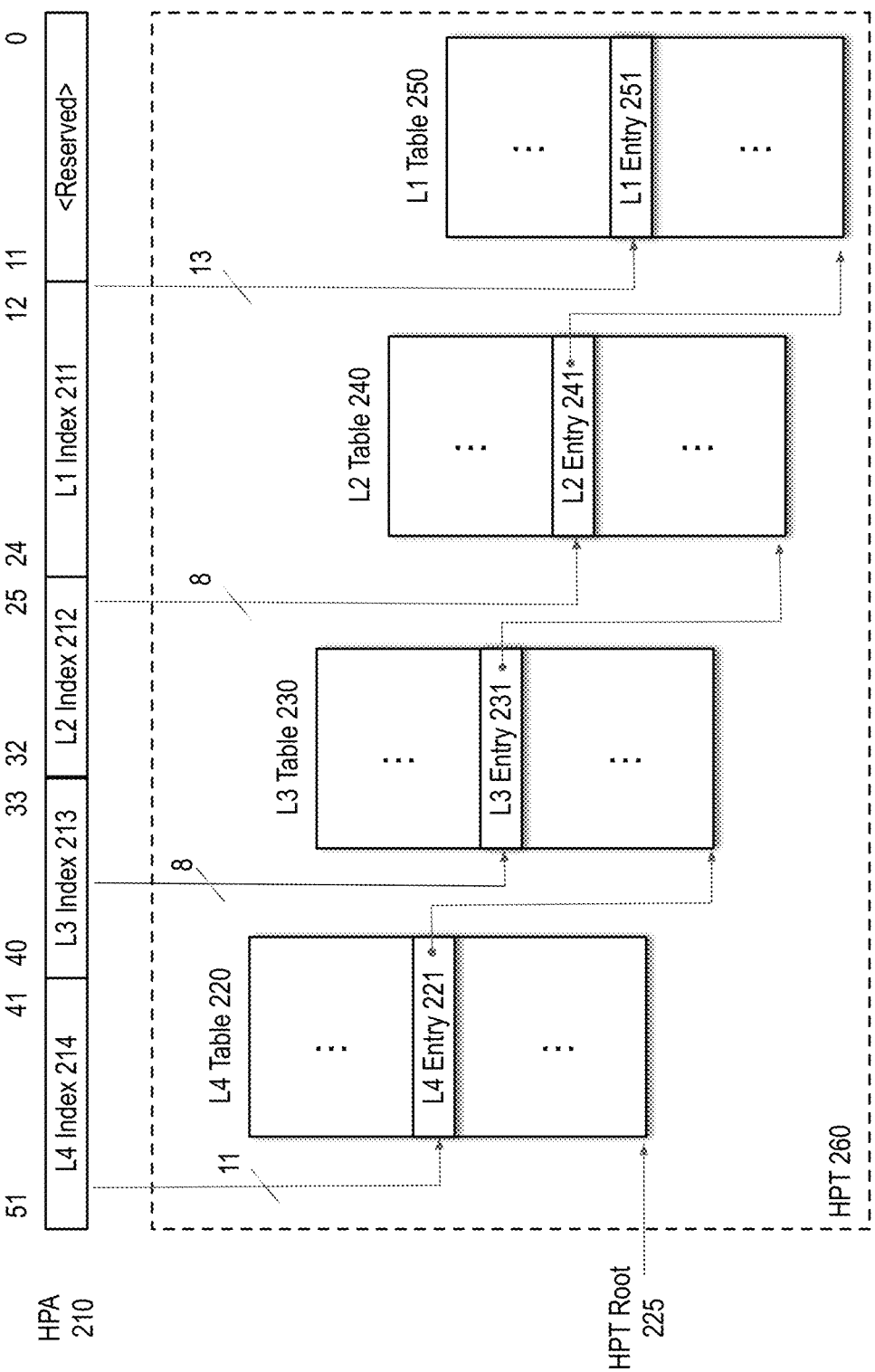
FIG. 2 is a block diagram illustrating how various portions of a host physical address (HPA) are used to walk through a multi-level HPT in accordance with an embodiment.

FIG. 2 is a block diagram illustrating how various portions of a host physical address (HPA) 210 are used to walk through a multi-level HPT 260 in accordance with an embodiment. HPT 260 is one of many possible representations of HPT 135 of FIG. 1. In the context of the present example, HPT 260 is organized as a hierarchical table, similar to how address translation page tables are organized. Various portions of HPA 210, including an L4 index 214, an L3 index 213, an L2 index, and an L1 index 211 in combination with HPT root 225 are used to retrieve permission entries (e.g., L4 entry 221, L3 entry 231, L2 entry 241 and/or L1 entry 251) from HPT 260. While in the context of the present example, HPA 210 is mapped based on a 4-level hierarchy, those skilled in the art will appreciate more or fewer levels may be used to represent HPT 260 depending upon the particular implementation.

One difference between the HPT 260 and regular address translation page tables is that the page access permissions can be tightly packed, since each set of page access permissions is much smaller than a regular address translation page table entry (e.g., from 2 to 4 bits versus 64-bits for a leaf entry of many existing address translation page table formats). As such, multiple sets of page access permissions be packed into a single cache line to achieve good spatial locality.

Another difference between the HPT 260 and other address translation page table formats is that in one embodiment permission entries of one or more levels of the HPT 260 function both as a leaf and non-leaf entries. For example, as described in further detail below, an L2 entry (e.g., L2 entry 241 holds page access permissions for pages of a first page size (e.g., 2 MB pages) and also a pointer to page access permissions for any region of the first page size that is fractured into a second page size (e.g., 4 KB pages). This dual function entry format facilitates support of page access permissions for pages of different sizes. For instance, page access permissions specified within an L1 entry (e.g., L1 entry 251) refer to permissions for accessing a page of the second page size (e.g., 4 KB), page access permissions specified within an L2 entry refer to permissions for accessing a page of the first page size (e.g., 2 MB), and page access permissions within an L3 entry refer to permissions for accessing a page of a third page size (e.g., 1 GB). Further details regarding permission entries associated with each HPT level to support 4 KB, 2 MB and 1 GB pages are provided below with reference to FIG. 3. In alternative embodiments, a fixed page size may be used and the permission entry format may be simplified accordingly.

Assuming that a system maps 52 bits of physical address space, FIG. 2 conceptually illustrates how the HPT walk is performed. Those skilled in the art will appreciate the particular physical address space, the number of levels of the hierarchy and the number and type of page sizes used in the context of the examples provided herein are not intended to be limiting and will be able to generalize the approach described herein to other physical address spaces, different hierarchical structures and differing numbers and/or types of page sizes. Further details in the form of example pseudocode of the HPT walk are provided below. Depending upon the particular implementation, the HPT walk may be performed for translated requests and can optionally be performed for translation requests. HPT lookup processing can also be accelerated using HPT caches as described below.

Initially, a pointer to HPT root 225 and the size of the top-level table (e.g., L4 table 220) of the HPT 260 can be obtained based on the Bus/Device/Function (BDF) descriptor contained within the request at issue as explained further below. Based on the size of the top-level table (e.g., 4 KB, 8 KB, 16 KB or 32 KB), if the request at issue relates to a page that is outside the scope of the HPT 260, the access is denied; otherwise, in the context of the present example, the L4 index 214 represented by the upper 11 bits (51:41) of the HPA 210 is used as an offset from a base address of the L4 table 220 specified by HPT root 225 to select an entry (e.g., L4 entry 221) from the L4 table 220. As described further below with reference to FIG. 4, in one embodiment, the L4 entry 221 contains information (e.g., a valid bit) indicating whether a base address of the L3 table 230 specified within the L4 entry 221 is valid.

If the validity information indicates the base address of the L3 table 230 in the L4 entry 221 is invalid (e.g., the valid bit is 0), then the requesting device does not have permission for the HPA 210. Otherwise, if the validity information indicates the base address of the L3 table 230 in the L4 entry 221 is valid (e.g., the valid bit is 1), then the walk continues by using the base address of the L3 table 230 in combination with the L3 index 213 represented by the next 8 bits (40:33) of the HPA 210 to select an entry (e.g., L3 entry 231) from the L3 table 230.

In the context of the present example, L3 entries of the L3 table 230 can act as both a leaf, containing the page access permissions, or as an intermediate node. Hence, as illustrated in the pseudocode example provided below, the page access permissions in the L3 entry 231 are checked. If the page access permissions indicate the page is readable or writable, then the HPT walk ends; otherwise, when the page is neither readable nor writable, the validity information of the L3 entry 231 is checked. If the validity information indicates the base address of the L2 table 240 in the L3 entry 231 is invalid, then the device has no permission for the HPA 210. Otherwise, if the validity information indicates the base address of the L2 table 240 in the L3 entry 231 is valid, then walk continues by using the base address of the L2 table 240 in combination with the L2 index 212 represented by the next 8 bits (32:25) of the HPA 210 to select an entry (e.g., L2 entry 241) from the L2 table 240. The L2 table 240 is walked similarly to the L3 table 230 and assuming the HPA 210 represents a page of the first size (e.g., a 4 KB page), finally, the L1 entry 251 of the L1 table 250 will contain the page access permissions of the HPA 210.

According to one embodiment, the response of the translation agent (e.g., the IOMMU) in the form of permission delivery or an error response, after the HPT walk has been completed, differs depending on whether the HPT walk was performed in response to translation request or a translated request as described in further detail below.

FIG. 3 is a table 310 illustrating various characteristics of levels 311 of a multi-level HPT in accordance with an embodiment. While other multi-level and flat HPT structures are contemplated, for purposes of facilitating a complete understanding of the secure address translation services approach described herein with reference to a particular concrete example, in the context of the present example, the multi-level HPT is assumed to be a 4-level hierarchical structure, such as the HPT 260 illustrated in FIG. 2 that supports multiple page sizes. Table 310 includes a column for each of a page size 312, a table size 313, an entry size 314, entries 315, index bits 316, offset bits 317 and coverage 318. As such, a given row for a particular level 311 identifies the corresponding characteristics based on the HPA 210 format of FIG. 2 and entry formats described below with reference to FIG. 4.

Figure 4:
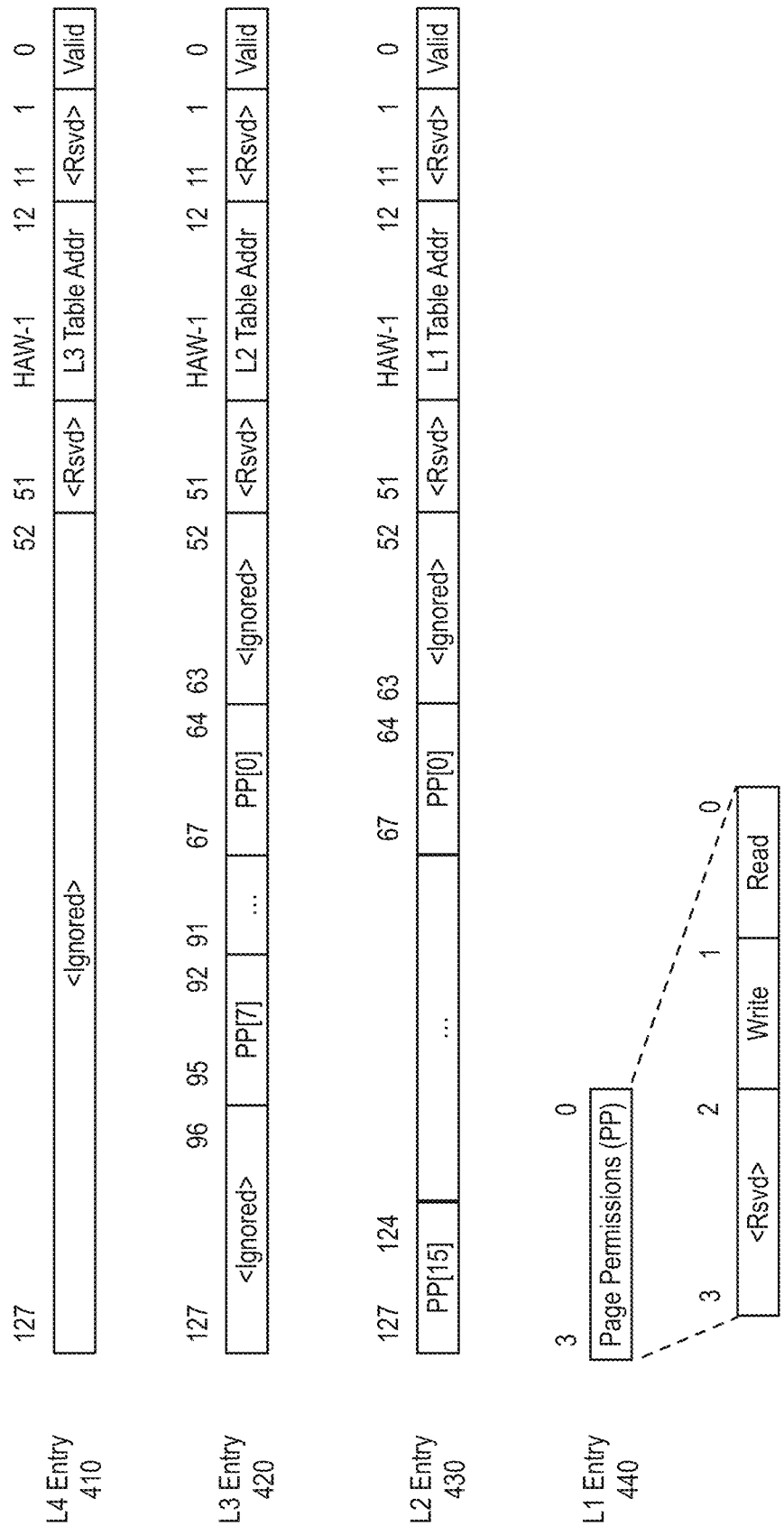
FIG. 4 is a block diagram illustrating entries of various tables of a multi-level HPT in accordance with an embodiment.

FIG. 4 is a block diagram illustrating entries of various tables of a multi-level HPT in accordance with an embodiment. As noted above, while other multi-level and flat HPT structures are contemplated, for purposes of facilitating a complete understanding of the secure address translation services approach described herein with reference to a particular concrete example, in the context of the present example, the multi-level HPT is assumed to be a 4-level hierarchical structure, such as the HPT 260 illustrated in FIG. 2 that supports multiple page sizes.

In the present example, the top-level entry (i.e., L4 entry 410) has a size of 128 bits as shown in FIG. 3. An indication regarding the validity of the L3 table address stored in bits (HAW-1:12) is provided by a valid bit at bit position 0. In the context of this example and in the pseudocode examples provided below, HAW represents the host physical address width. When the valid bit is TRUE (i.e., 1), then the L3 table address is valid and can be used as a base address to index into the L3 table (e.g., L3 table 230). When the valid bit is FALSE (i.e., 0), then the L3 table address is invalid and should not be used, for example, as part of an ongoing HPT walk. According to one embodiment, the valid bits of all HPT entries are initialized to FALSE and remain FALSE unless page access permissions have been expressly established by system software running on the host system. In this manner, any attempt to access a physical address within a memory page that has not been configured by system software will be disallowed by the translation agent, thereby allowing the system software to focus on selectively configuring page access permissions for memory pages expressly being authorized for access by particular contexts of devices.

According to one embodiment and in the context of the present example, the L3 entry 420 has a size of 128 bits as shown in FIG. 3 and includes eight sets of page access permissions (i.e., PP[0]-PP[7]), an L2 table address at bits (HAW-1:12), and a valid bit at bit position 0. The eight sets of page access permissions result from the amount of address space encoded in the L2 Table below, which corresponds to 8 GB of memory. Each one of the page access permissions (i.e., PP[0]-PP[7]) correspond to the permission of one of the eight 1 GB pages. The L2 table address specifies the base address of the L2 table (e.g., L2 table 240) when the valid bit is TRUE and is invalid when the valid bit is FALSE. The encoding of the page access permissions (i.e., PP[0]-PP[7]) in the L3 entry 420 is the same as in the L1 entry 440.

According to one embodiment and in the context of the present example, the L2 entry 430 has a size of 128 bits as shown in FIG. 3 and includes sixteen sets of page access permissions (i.e., PP[0]-PP[15]), an L1 table address at bits (HAW-1:12), and a valid bit at bit position 0. The sixteen sets of page access permissions result from the amount of address space encoded in the L1 Table below, which corresponds to 32MB of memory. Each one of the page access permissions (i.e., PP[0]-PP[15]) correspond to the permission of one of the sixteen 2 MB pages. The L1 table address specifies the base address of the L1 table (e.g., L1 table 250) when the valid bit is TRUE and is invalid when the valid bit is FALSE. The encoding of the page access permissions (i.e., PP[0]-PP[15]) in the L2 entry 430 is the same as in the L1 entry 440.

According to one embodiment and in the context of the present example, the lowest-level entry (i.e., L1 entry 440) has a size of 4 bits as shown in FIG. 3 and includes one set of page (access) permissions for a single 4 KB page. According to the present example, the page permissions and the L1 entry 440 are one in the same as there are no further hierarchical levels to walk. As PCIe supports read and write transactions, in one embodiment, the page permissions include 1 bit to indicate whether the device can read the page at issue (e.g., 1=read is permitted; 0=read is not permitted), 1-bit to indicate whether the device can write to the page (e.g., 1=write is permitted; 0=write is not permitted), and 2 bits for future expansion. Depending upon the particular implementation, more bits can be used to represent the permissions (if, for example, more than two states are desired to represent the access rights) and/or the reserved bits can be excluded.

Example Pseudocode

Continuing with the example 4-level hierarchical table structure described with reference to FIGS. 2-4, for purposes of completeness, pseudocode is provided below in Table 1 to illustrate a non-limiting example of how to perform an HPT walk. In Table 1, square brackets "H" refer to bit offsets and the "MEMORY(Argument)" function refers to a memory access to the address specified in the Argument. The inputs to the pseudocode example include HPA, HPT_Root, Host Address Width (HAW), and HPT L4 Size (HSIZE). The outputs include the page access permissions or page permissions (PP) and Page Size.

TABLE 1

Pseudocode illustrating an HPT Walk

```
Start:
If HPA[ 64:HAW] !=0
  Reserved bits error
If ( (HSIZE < 3) AND (HPA[51:49+HSIZE] != 0) )
  Return permissions 00b with Invalid Page Size
L4_Entry ← MEMORY(HPT_Root XOR (HPA[51:41] * 16) )
If (L4_Entry[51:HAW] != 0) OR (L4_Entry[11:1] != 0)
  Reserved bits error
If (L4_Entry[0:0] = 0b)
  Return permissions 00b with Invalid Page Size
Else if (L4_Entry[0:0] != 0b)
  Goto L3_Walk
L3_Walk:
L3_Entry ← MEMORY( (L4_Entry[HAW-1:12] << 12) XOR (HPA[40:33] * 16) )
If (L3_Entry[51:HAW] != 0) OR (L3_Entry[11:1] != 0)
  Reserved bits error
L3_PP_Start ← 64 + (HPA[32:30] * 4)
L3_PP ← L3_Entry[L3_PP_Start+3 : L3_PP_Start]
If (L3_PP[3:2] != 0)
  Reserved bits error
If (L3_PP[1:0] != 00b)
```

TABLE 1-continued

Pseudocode illustrating an HPT Walk

```
  Return permissions L3_PP[1:0] with 1GB Page Size
Else if (L3_PP[1:0] = 00b)
If (L3_Entry[0:0] = 0b)
  Return permissions 00b with Invalid Page Size
Else if (L3_Entry[0:0] != 0b)
  Goto L2_Walk
L2_Walk:
L2_Entry ← MEMORY( (L3_Entry[HAW-1:12] << 12) XOR (HPA[32:25] * 16) )
If (L2_Entry[51:HAW] != 0) OR (L2_Entry[11:1] != 0)
  Reserved bits error
L2_PP_Start ← 64 + (HPA[34:21] * 4)
L2_PP ← L2_Entry[ L2_PP_Start+3 : L2_PP_Start]
If (L2_PP[3:2] != 0)
  Reserved bits error
If (L2_PP[1:0] != 00b)
  Return permissions L2_PP[1:0] with 2MB Page Size
Else if (L2_PP[1:0] = 00b)
If (L2_Entry[0:0] = 0b)
  Return permissions 00b with Invalid Page Size
Else if (L2_Entry[0:0] != 0b)
  Goto L1_Walk
L1_Walk:
L1_PP_Start ← MEMORY (64 + (HPA[24:12] * 4) )
L1_PP ← L2_Entry[L1_PP_Start+3 : L1_PP_Start]
If (L1_PP[3:2] != 0)
  Reserved bits error
If (L1_PP[1:0] != 00b)
  Return permissions L1_PP[1:0] with 4KB Page Size
Else if (L1_PP[1:0] = 00b)
  Return permissions 00b with Invalid Page Size
```

High-Level Translation Agent Processing

Figure 5:
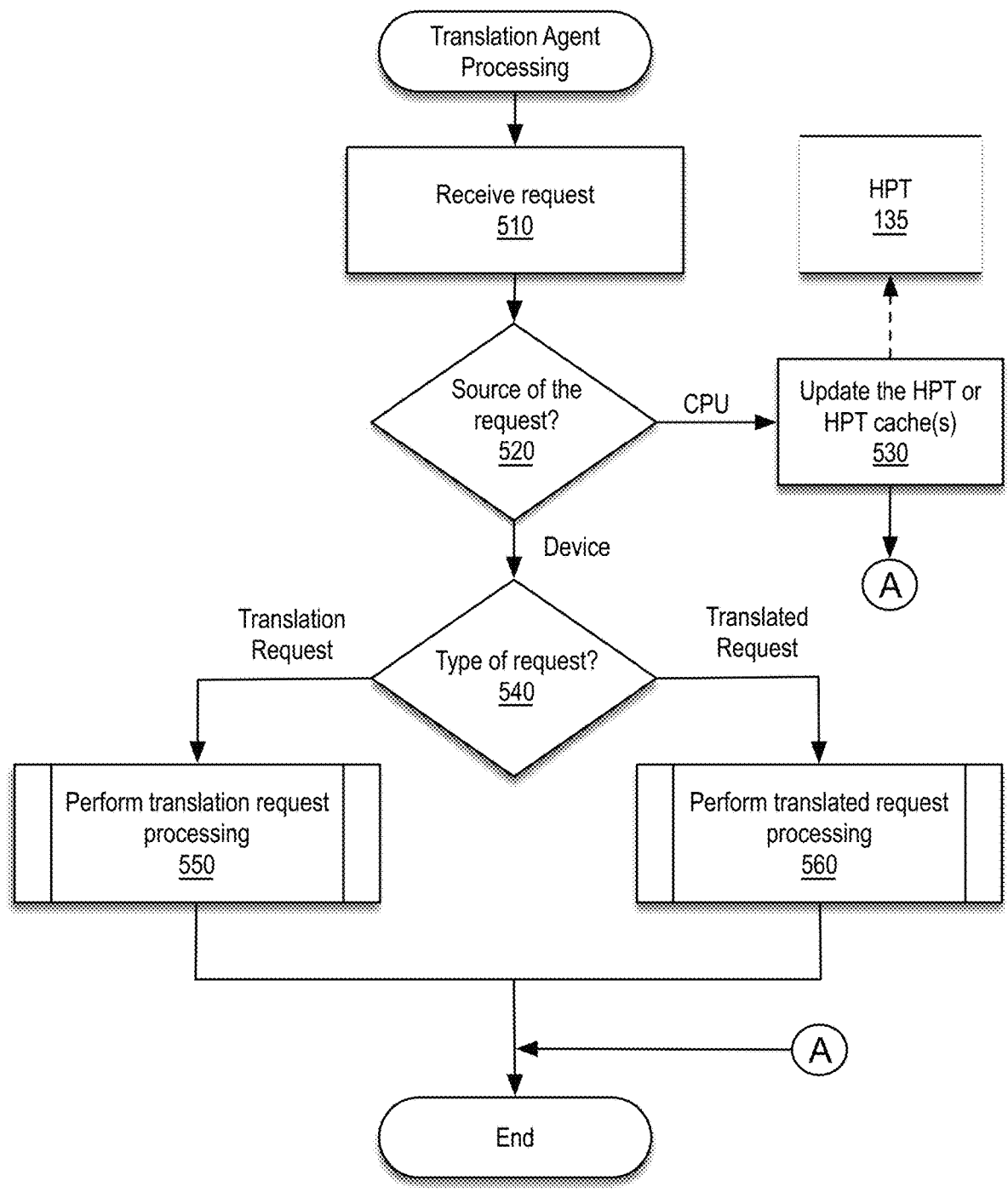
FIG. 5 is a flow diagram illustrating high-level translation agent processing in accordance with an embodiment.

FIG. 5 is a flow diagram illustrating high-level translation agent processing in accordance with an embodiment. At block 510, the translation agent receives a request (e.g., a request from a processor (e.g., CPUs 110) or an ATS translated request or ATS translation request from a device (e.g., devices 141*a-c*)). As described further below a request from a processor would typically represent a request to configure the HPT or a request to invalidate entries within the optional HPT cache(s) (e.g., HPT cache(s) 131).

At decision block 520, the translation agent determines the source of the request. When the source of the request is a CPU, then processing branches to block 530. Otherwise, when the source of the request is a device (e.g., an integrated or discrete device compliant with the ATS Specification), then processing continues with decision block 540.

At block 530, a request has been received from the CPU to configure the HPT or to invalidate one or more cache entries. Responsive to the request, the translation agent updates the HPT or updates the optional HPT cache(s) as appropriate. In some embodiments, the update of the HPT is performed exclusively by software.

At decision block 540, a request has been received from a device. Responsive to the request, the translation agent determines the type of the request. When the request is a ATS translation request, then processing branches to block 550. Otherwise, when the request is an ATS translated request, then processing branches to block 560.

At block 550, the translation agent performs translation request processing, including, among other things, translating the specified VA to an HPA. A non-limiting example of translation request processing is described in further detail below with reference to FIG. 8.

At block 560, the translation agent performs translated request processing, including, among other things, verifying page access permission of the context of the device to perform the requested memory operation. A non-limiting example of translated request processing is described in further detail below with reference to FIG. 6.

ATS Translated Request Processing

According to one embodiment, ATS translated requests with a given HPA are checked using the HPT to verify that the device has permission to perform the specified read/write operation.

For instance, using the request's Bus/Device/Function (BDF) descriptor, the IOMMU can obtain the associated Context Entry. If HPT has been enabled for the device in that Context Entry, the HPT is checked to obtain the associated page access permissions. If the page access permissions allow for that read/write operation, then the access is allowed. If the associated page access permissions indicate no-permission (e.g., 00b) or if there is a reserved bit error, then the access is not allowed.

Depending on the HPT software usage, HPT page permissions can reflect either the 2nd level table permissions only, which are assigned and managed by a VMM (e.g., VMM 115), or reflect both the 1st and 2nd level table permissions, which are assigned by a VM (e.g., VMs 116a-n) and the VMM respectively. In the first case, the VMM can assign less strict permissions compared to the VM. For instance, the 2nd level table permissions and HPT page permissions may allow read and write access to a device to a VM's page, while the VM may have set read-only access permissions to that device for the same page. In this case, according to one embodiment, the device translated request to write to that HPA will be allowed. Similarly, it is up to the system software to ensure consistency between address translation page table permissions and HPT page permissions.

Figure 6:
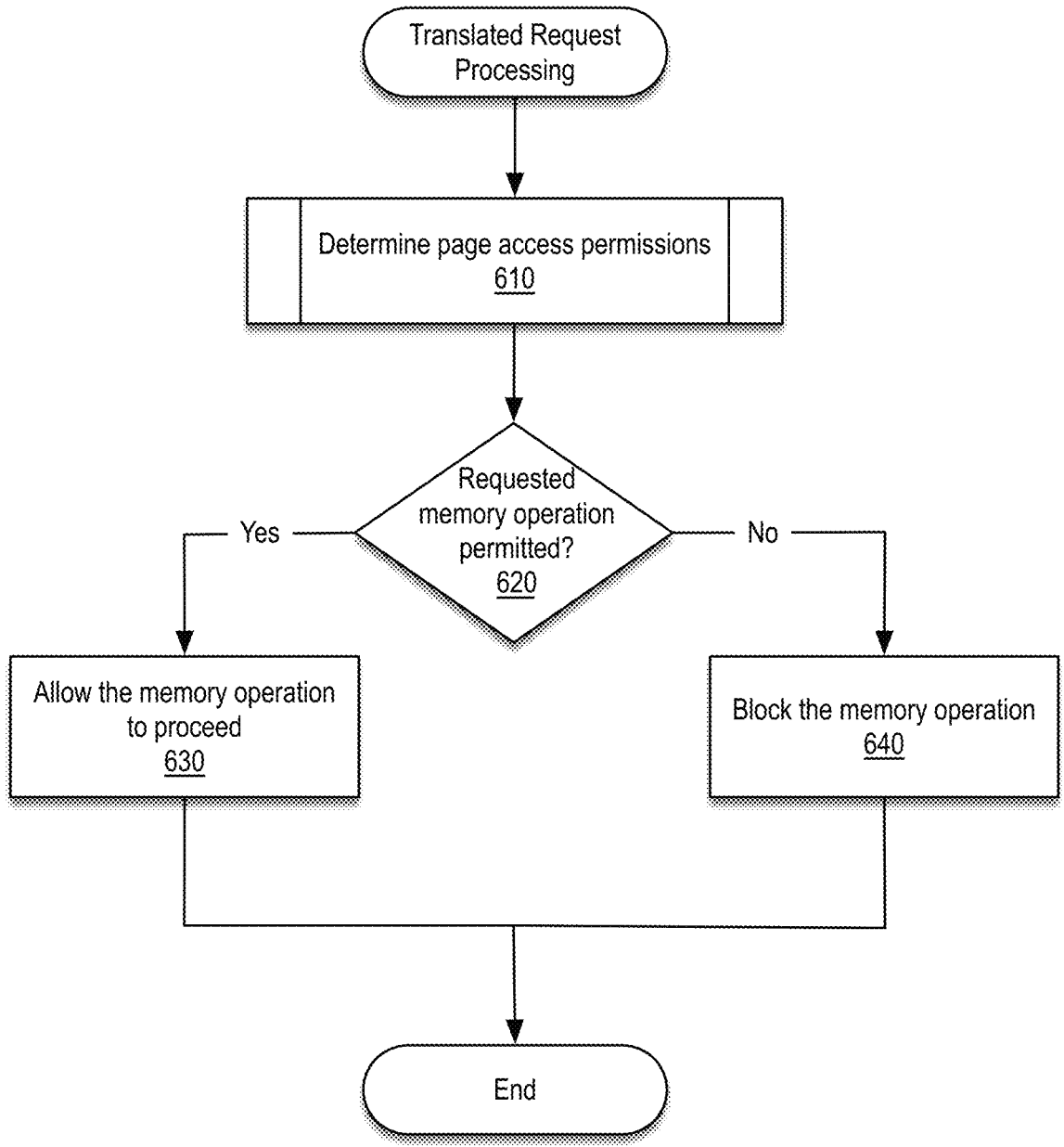
FIG. 6 is a flow diagram illustrating translated request processing in accordance with an embodiment.

FIG. 6 is a flow diagram illustrating translated request processing in accordance with an embodiment. According to one embodiment, FIG. 6 represents processing that may be performed by block 560 of FIG. 5. In the context of the present example, it is assumed at this stage of processing, the translation agent has previously determined the request at issue is an ATS translated request.

At block 610, the translation agent determines page access permissions associated with the HPA specified in the ATS translated request. A non-limiting example of page access permission processing is described in further detail below with reference to FIG. 7.

At decision block 620, based on the page access permissions determined at block 610, the translation agent makes a determination regarding whether the memory operation specified by the ATS translated request is permitted. In one embodiment, the translation agent makes the determination based on the specified memory operation (e.g., a read operation or a write operation) and the page access permissions associated with the page attempting to be accessed. For example, the translation agent can check the write access indication of the page access permissions for the page at issue for write operations and can check the read access indication of the page access permissions for the page for read operations. When the corresponding access indication (e.g., the read or write permission bit) of the page access permissions indicates the operation at issue is permitted then, processing continues with block 630. Otherwise, when the corresponding access indication of the page access permissions indicates the operation at issue is not permitted (or if there is an error, for example, a reserved bit error), then, processing continues with block 640.

At block 630, the translation agent allows the memory operation to proceed to its destination. Depending upon the entity (e.g., IOMMU) that implements the translation agent, the translation agent may complete the memory operation on behalf of the requesting device.

At block 640, the translation agent blocks the memory operation. In one embodiment, write operations may be dropped to avoid memory corruption and read operations can return an Unsupported Request (UR) to the device. Additionally or alternatively, the translation agent may log any errors and notify the host via existing fault logging mechanisms.

Figure 7:
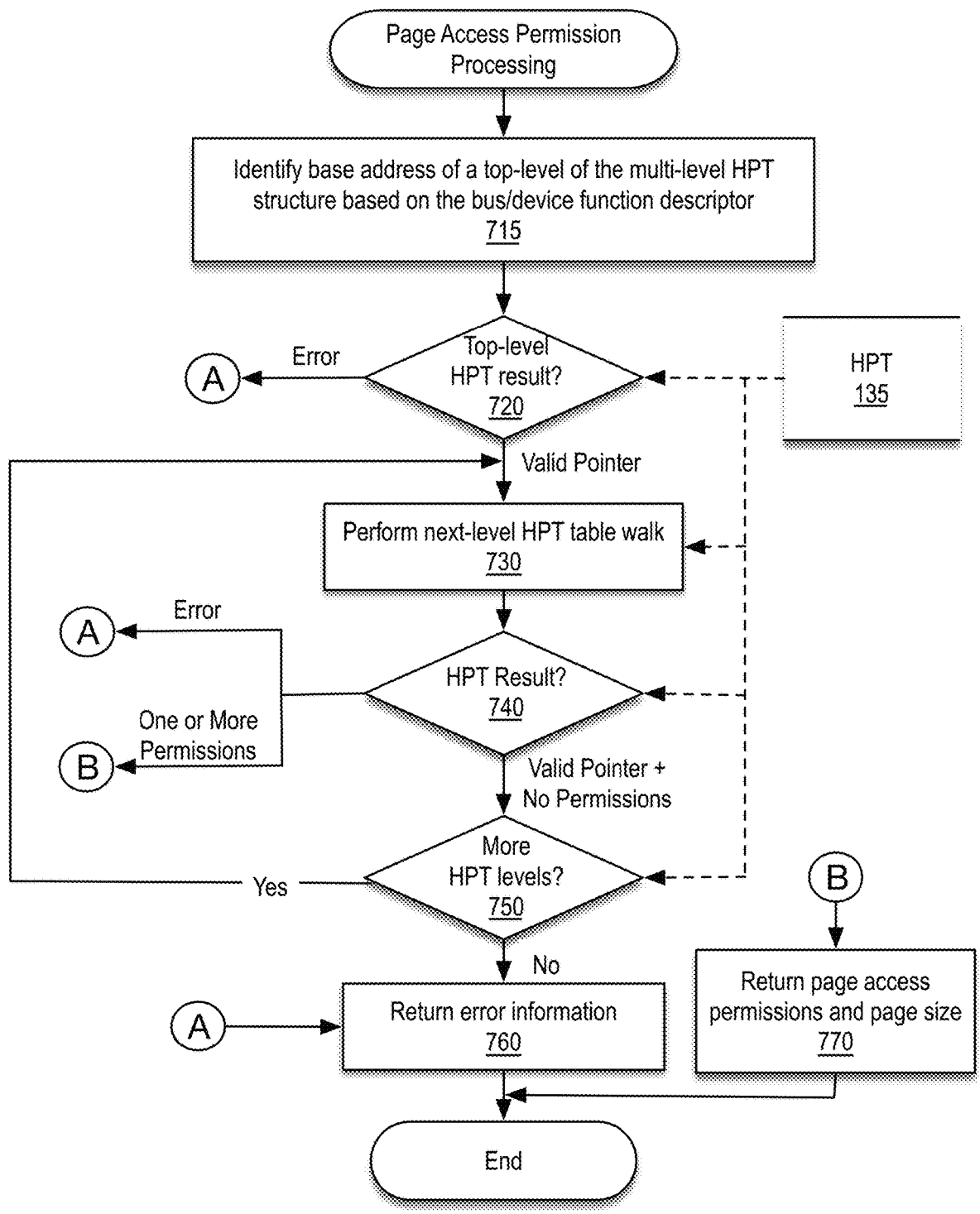
FIG. 7 is a flow diagram illustrating page access permission processing in accordance with an embodiment.

FIG. 7 is a flow diagram illustrating page access permission processing in accordance with an embodiment. According to one embodiment, FIG. 7 represents processing that may be performed by block 610 of FIG. 6.

At block 715, the translation agent identifies the base address of a top-level (e.g., L4 table 220) of the multi-level HPT structure and/or other information to facilitate performance of the HPT walk based on the Bus/Device/Function (BDF) descriptor contained within the request at issue. For example, the BDF descriptor may be used to access HPT walk input parameters (e.g., HPA, HPT_Root, HAW, and HSIZE) from a context table (e.g., a BDF Context Entry or the Process Address Space Indenter (PASID) Entry) for performing the HPT walk.

At decision block 720, translation agent evaluates the top-level HPT result based on the HPT 135. For example, the translation agent may check whether the HPA of the request at issue falls outside of the HPT structures, check whether the HPA contains reserve bit errors and/or check the validity information (e.g., the valid bit) of the top-level entry (e.g., L4 entry 221) as described above. When the top-level HPT result is indicative of an error, then processing branches to block 760. When the top-level HPT result indicates the top-level entry contains a valid next-level HPT table address (a valid pointer), then processing continues with block 730 to continue the HPT walk.

At block 730, the translation agent continues page access permission processing by performing the next level of the HPT table walk as discussed above.

At decision block 740, the translation agent evaluates the HPT result for the current level. In one embodiment, for intermediate levels (e.g., the L3 table 230 and the L2 table 240), the translation agent performs the same checks as described above with reference to decision block 720 and additionally checks the page access permissions of the entry. When the HPT result is indicative of an error, then processing branches to block 760. When the HPT result indicates the entry associated with the current level of the HPT table walk contains a valid pointer to the next-level HPT table and the page access permissions are indicative of no permissions, then processing continues with decision block 750. Otherwise, when the HPT result indicates the entry associated with the current level of the HPT table walk contains page access permissions indicating that at least one of read or write is permitted, then processing continues with block 770.

At decision block 750, the translation agent determines whether there are additional HPT levels to walk. If there are one or more additional HPT levels to walk, then processing loops back to block 730 to continue the HPT walk. Otherwise, processing continues with block 760.

At block 760, either an error was detected during the HPT walk or the HPT walk completed without finding an entry with permissions. As such, in the context of the present example, the translation agent returns error information to the requesting device and page access permission processing is complete.

At block 770, an HPT entry was found during the HPT walk containing page access permissions indicating at least one of read or write is permitted for the page at issue. In one embodiment, the page access permissions of the HPT entry and the page size associated with the HPT entry are returned to the requesting device (e.g., via block 610 of FIG. 6 or block 820 of FIG. 8). At this point, page access permission processing is complete.

ATS Translation Request Processing

According to one embodiment, ATS translation requests with a given VA can optionally also perform either, both or neither of two optimizations. The first potential optimization involves prefetching of the HPT, in order to avoid an HPT cache miss on an upcoming ATS translated Request. The second potential optimization involves proactively checking the HPT in order to allow system software to dynamically build the HPT page permissions in advance of an anticipated ATS translated request.

In the first optional optimization scenario, the translation agent may use the ATS translation request as a hint that the device will soon issue an ATS translated request to the resulting HPA. As such, the translation agent can proactively perform the HPT walk and bring the page access permissions of the located HPT entry into the HPT caches in order to avoid a future HPT cache miss.

In the second optional optimization scenario, the translation agent may perform the HPT walk and check the HPT page permissions, in addition to the address translation page table permissions, and compute the sum of those (least possible privileges) to facilitate the provision of advanced notice to system software that a device may soon use a new page that has yet to be configured with page access permissions, for example. According to one embodiment, this mechanism may be used by the device, in order to alert system software that it is going to use a new page and that system software should populate the appropriate HPT page permissions.

Figure 8:
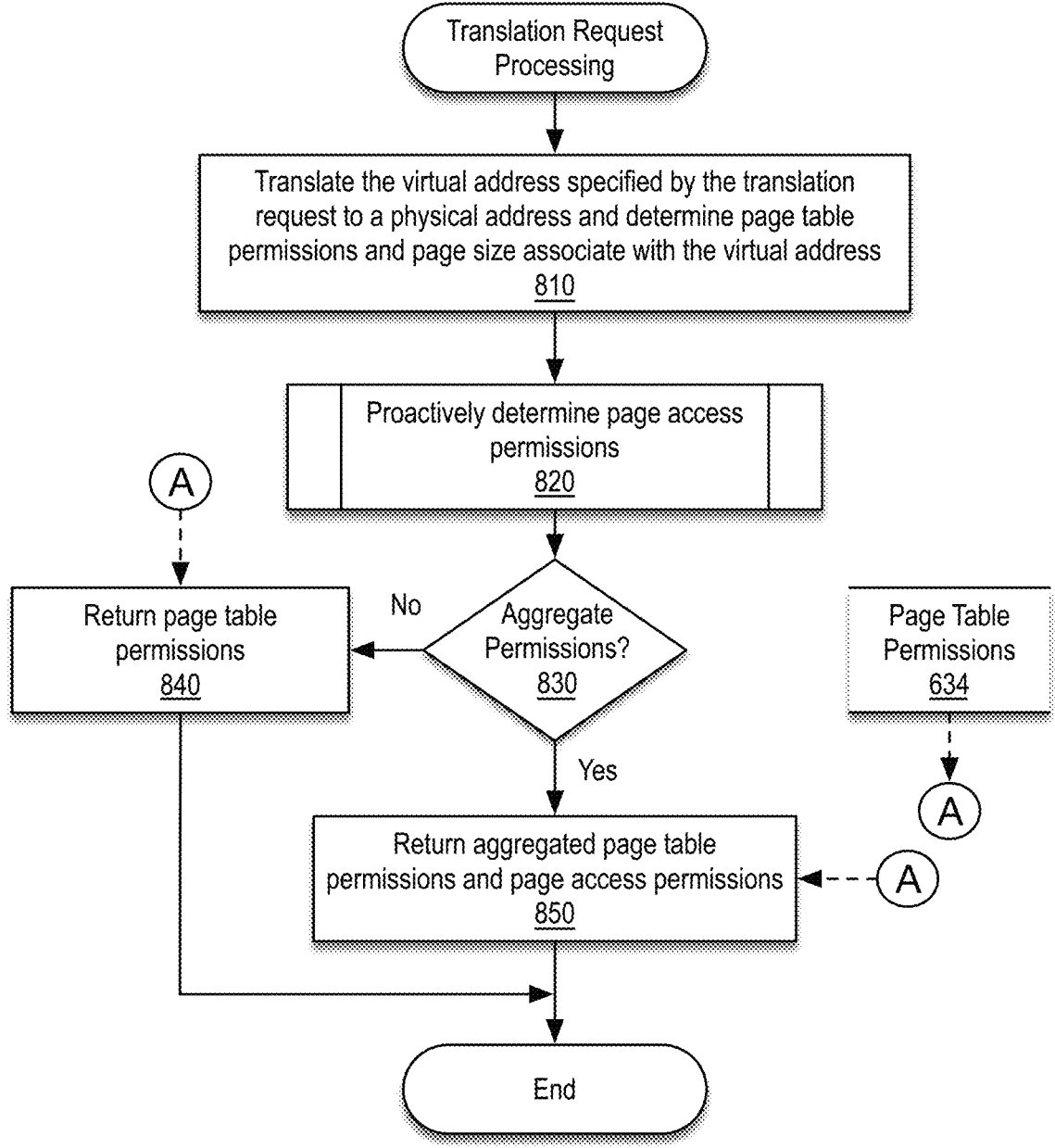
FIG. 8 is a flow diagram illustrating translation request processing in accordance with an embodiment.

FIG. 8 is a flow diagram illustrating translation request processing in accordance with an embodiment. According to one embodiment, FIG. 8 represents processing that may be performed by block 550 of FIG. 5. In the context of the present example, it is assumed at this stage of processing, the translation agent has previously determined the request at issue is an ATS translation request.

At block 810, the translation agent translates the VA specified in the ATS translation request to an HPA and determines the page table permissions and page size associated with this virtual address. For example, the translation agent may use conventional address translation page tables to perform this translation.

At block 820, in order to facilitate one or more of the potential optimization scenarios described above (e.g., prefetching and/or dynamic building of the HPT page permissions by system software), the translation agent proactively determines page access permissions (despite that fact that a memory operation has not yet been requested). In this manner, to the extent optional HPT cache(s) are implemented, the page access permissions can be brought into the HPT cache(s) in order to avoid a future HPT cache miss. Also, instead of system software presetting the HPT for all memory pages that contexts of devices might access (e.g., all memory in a VM), the second optimization scenario discussed above can be used to provide system software with a notice regarding the current state of the lowest level of access permissions and/or error information responsive to an ATS translation request to facilitate dynamic building of the HPT. A non-limiting example of page access permission processing that may be used to proactively determine page access permissions was described above with reference to FIG. 7.

At decision block 830, a determination is made regarding whether optional aggregation of address translation table page table permissions and HTP page access permission is to be returned to the requesting device. For example, when the second optimization scenario is being employed, an aggregate permissions indicator may be set. When the determination is affirmative, processing continues with block 850; otherwise, when the determination is negative, processing branches to block 840.

At block 840, the HPA determined at block 810 as well as the page table permissions by the conventional page table permissions 634 (e.g., the read/write/execute status bits or flags contained within the address translation page tables that facilitate VA to HPA mapping) for the memory page are returned to the requesting device and translation request processing is complete.

At block 850, the HPA determined at block 810 as well as aggregated HPT page access permissions and page table permissions for the memory page at issue are returned to the requesting device and translation request processing is complete. In one embodiment, the aggregated page table permissions and page access permissions represent the lowest level of access permitted by both the conventional page table permissions 634 and the page permissions stored within the HPT 135. For example, if the page table permissions 634 allow read, write and execute access, but the corresponding page access permissions in the HPT 135 only allow read access, then subsequent translated request processing is based on the least common denominator, which in this case is limited to read access. According to one embodiment, if the page size encoded in the page translation table differs from the page size encode in the HPT, the page size returned to the device is the smaller of the two.

As noted above, according to one embodiment, this aggregation of the current state of the lowest level of access permissions facilitates the second optimization scenario by allowing the requesting device and system software to collaborate and assign new pages and permissions as needed, instead of system software presetting the HPT for all the memory that the device could access (e.g., all memory in a VM). For example, if the resulting aggregated page permissions allow for the device to access the HPA, then the HPA is sent to the device, along with the resulting permissions and the page size. If the resulting aggregated permissions do not allow for the device to access the HPA, then the translation agent (e.g., the IOMMU) can return no permissions to the requesting device. In response to this message, the device can make a Page Request to allow system software to handle any page faults and dynamically assign the appropriate HPT permissions. As such, this optimization scenario allows the requesting device and system software to collaborate and assign new pages and permissions as needed, instead of system software presetting the HPT for all the memory that the device could access (e.g., all memory in a VM). Optionally, if the device does not support Page Requests, the device can treat the lack of permissions as a regular failed translation request and issue an interrupt to the host device driver to handle it.

HPT Configuration

As noted above, in one embodiment, the HPT may be configured on a per bus, per device, per port, per function or per process basis, depending on how coarse or fine-grained the system software would like to have access control performed. For instance, if the HPT is configured on a per bus basis, then every device on that bus and every process (of any tenant) that runs on those devices will have the same access permissions. On the other hand, if the HPT is configured on a per process basis, then each process can have its own HPT structures. The latter scenario would allow for fine-grained access control, but it would have a larger storage requirement in order to store the HPT structures.

In either case, the entry that describes the bus, device, port or process can be extended to hold the HPT_Root pointer (e.g., HPT Root 225) and the HPT L4 Size (HSIZE). Currently, Intel® Virtualization Technology for Directed I/O (VT-d) organizes devices using the Bus/Device/Function (BDF) identifier and the Process Address Space Identifier (PASID). As such, in one embodiment, the HPT_Root and HSIZE may be integrated as part of the BDF Context Entry or the PASID Entry.

According to one embodiment, a storage optimization for this approach would be for system software to assign the same HPT structures to more than one HPT Root pointer. This would mean that more than one device or process, for example, across different buses would have the same page access permissions. This use case might be helpful for a single tenant, for example, that is using multiple devices.

HPT Cache Lookup and Invalidation

To accelerate the HPT walk, in one embodiment, one or more new dedicated caches (e.g., HPT cache(s) 131) may be introduced in the IOMMU. The caches can be organized as either per-level (L1, L2, L3, L4) or as 2-level, one dedicated cache for L1 and one cache for the combined L2, L3, L4. Also, since a compact representation of the page access permissions are only two bits per page (excluding the two reserved bits), the caches can be optimized in one embodiment so that each cache entry holds permissions of multiple, physically consecutive pages.

According to one embodiment, the HPT cache lookup can be performed by searching the L1, L2, L3 (and potentially L4) caches in parallel. If the look up results in a hit with enough permissions to allow the access at issue, the HPT walk can be performed with the given permissions. In the case of a miss or a partial hit (in the upper level caches), the HPT walk may continue from the lowest level that returned a hit.

In certain implementations, there may be relaxed requirements that do not require software invalidation of cache entries in cases that can be entirely handled by hardware. For example, hardware may not require a software invalidation when increasing the page access permissions granted by an HPT entry (for example, going from a read-only to a read-write page). In that case, when hardware finds an entry with insufficient permissions in an HPT cache (e.g., a read-only HPT cache entry when the device is trying to write), the translation agent may perform a self-invalidation of the cached entry and re-do the HPT walk from the HPT root pointer to fetch the up-to-date page access permissions.

In one embodiment, if the outcome of the HPT lookup indicates no page access permissions, then the translation agent can invalidate the HPT cache entry and reperform the HPT walk. This approach allows software to avoid invalidating entries in the HPT cache when it maps more memory into the HPT.

In one embodiment, software may be required to invalidate the HPT cache entries after it modifies HPT entries. According to this embodiment, in order to enable HPT cache invalidations, a new Invalidation Descriptor may be provided. Depending upon the particular implementation, system software may use the new descriptor to trigger invalidations at various levels of granularity (e.g., at a global level, at a domain-selective level or at an HPA-selective-within-domain level of granularity). Non-limiting example system software flows that may require an HPT invalidation include (i) system software reducing or removing device permissions for a page, (ii) system software changing the location of an HPT intermediate table and (iii) system software changing the page size of a device accessible page.

HPT Virtualization

Optionally, in one embodiment, a VMM (e.g., VMM 115) can choose to virtualize the HPT table, in order to allow a VM to define its own HPT page permissions for the devices the VM uses. In such a scenario, the VMM can expose the HPT via a virtual-IOMMU, for example, that is visible to the guest. Any changes the VM makes to the virtual HPT can be trapped by the VMM and propagated to the VMM HPT that is visible to the hardware translation agent (e.g., IOMMU). In this manner, VMs are free to apply fine-grained page access permissions based on their particular needs, instead of the VMM potentially assigning coarse-grained page access permissions that restrict devices to all HPAs belonging to a particular VM.

HPT For Other Links

In addition to PCI traffic, the HPT access control approach described herein can also be applied to cache coherent links, such as CXL cache device transactions or the like. Similarly, any device read/write request over such a protocol can be treated as an ATS Translated Request and be subjected to the access control checks described herein, for example, by way of an HPT lookup.

In one embodiment, optionally, if a device supports both PCIe and a cache-coherent link, such as CXL, then the HPT cache(s) 131 can include separate dedicated PCIe HPT caches and CXL HPT caches or the caches can be merged together.

Exemplary Computing Architecture

FIG. 9 is a block diagram illustrating a computing architecture which may be adapted to implement a secure address translation service using a permission table (e.g., HPT 135 or HPT 260) and based on a context of a requesting device in accordance with some examples. The embodiments may include a computing architecture supporting one or more of (i) verification of access permissions for a translated request prior to allowing a memory operation to proceed; (ii) prefetching of page permission entries of an HPT responsive to a translation request; and (iii) facilitating dynamic building of the HPT page permissions by system software as described above.

In various embodiments, the computing architecture 900 may comprise or be implemented as part of an electronic device. In some embodiments, the computing architecture 900 may be representative, for example, of a computer system that implements one or more components of the operating environments described above. In some embodiments, computing architecture 900 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, one or more processor(s) 902 are coupled with one or more interface bus(es) 910 to transmit communication signals such as address, data, or control signals between processor 902 and other components in the system. The interface bus 910, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 902 include an integrated memory controller 916 and a platform controller hub 930. The memory controller 916 facilitates communication between a memory device and other components of the system 900, while the platform controller hub (PCH) 930 provides connections to I/O devices via a local I/O bus.

Memory device 920 can be a dynamic random-access memory (DRAM) device, a static random-access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 execute an application or process. Memory controller hub 916 also couples with an optional external graphics processor 912, which may communicate with the one or more graphics processors 908 in processors 902 to perform graphics and media operations. In some embodiments a display device 911 can connect to the processor(s) 902. The display device 911 can be one or more of an internal display device, as in a mobile electronic device or a laptop device or an external display device attached via a display interface (e.g., DisplayPort, etc.). In one embodiment the display device 911 can be a head mounted display (HMD) such as a stereoscopic display device for use in virtual reality (VR) applications or augmented reality (AR) applications.

In some embodiments the platform controller hub 930 enables peripherals to connect to memory device 920 and processor 902 via a high-speed I/O bus. The I/O peripherals include, but are not limited to, an audio controller 946, a network controller 934, a firmware interface 928, a wireless transceiver 926, touch sensors 925, a data storage device 924 (e.g., hard disk drive, flash memory, etc.). The data storage device 924 can connect via a storage interface (e.g., SATA) or via a peripheral bus, such as a Peripheral Component Interconnect bus (e.g., PCI, PCI Express). The touch sensors 925 can include touch screen sensors, pressure sensors, or fingerprint sensors. The wireless transceiver 926 can be a Wi-Fi transceiver, a Bluetooth transceiver, or a mobile network transceiver such as a 3G, 4G, Long Term Evolution (LTE), or 5G transceiver. The firmware interface 928 enables communication with system firmware, and can be, for example, a unified extensible firmware interface (UEFI). The network controller 934 can enable a network connection to a wired network. In some embodiments, a high-performance network controller (not shown) couples with the interface bus 910. The audio controller 946, in one embodiment, is a multi-channel high definition audio controller. In one embodiment the system 900 includes an optional legacy I/O controller 940 for coupling legacy (e.g., Personal System 2 (PS/2)) devices to the system. The platform controller hub 930 can also connect to one or more Universal Serial Bus (USB) controllers 942 connect input devices, such as keyboard and mouse 943 combinations, a camera 944, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a system supporting secure address translation services, the system comprising: dynamic random access memory (DRAM) for storage of data; an Input/Output Memory Management Unit (IOMMU) coupled to the DRAM; and a host-to-device link to couple the IOMMU with one or more devices and to operate as a translation agent on behalf of the one or more devices in connection with memory operations relating to the DRAM, including: receiving a translated request from a discrete device of the one or more devices via the host-to-device link, wherein the translated request specifies a memory operation and a physical address within the DRAM pertaining to the memory operation; determining page access permissions assigned to a context of the discrete device for a physical page of the DRAM within which the physical address resides; allowing the memory operation to proceed when the page access permissions permit the memory operation; and blocking the memory operation when the page access permissions do not permit the memory operation.

Example 2 includes the subject matter of Example 1, wherein the IOMMU makes use of a host permission table (HPT) that associates a page permission entry with each physical page of a plurality of physical pages of the DRAM and each of a plurality of contexts of the discrete device and wherein said determining further comprises locating the page permission entry corresponding to the context of the discrete device and the physical page within the HPT.

Example 3 includes the subject matter of Examples 1-2, wherein the HTP is organized as a multi-level hierarchical table.

Example 4 includes the subject matter of Examples 1-3, wherein the host-to-device link comprises a Peripheral Component Interconnect Express (PCIe) interface or a cache-coherent interface.

Example 5 includes the subject matter of Examples 1-4, wherein the discrete device comprises a graphics processing unit (GPU).

Some embodiments pertain to Example 6 that includes a method of determining access permissions for a translated request, the method comprising: receiving, by a translation agent of a host system, a translated request from a device via a host-to-device link, wherein the translated request specifies a memory operation and a physical address within a memory of the host system associated with the memory operation; determining, by the translation agent, page access permissions assigned to a context of the device for a physical page of the memory within which the physical address resides; when the page access permissions permit the memory operation, then allowing, by the translation agent, the memory operation to proceed; and when the page access permissions do not permit the memory operation, then blocking, by the translation agent, the memory operation.

Example 7 includes the subject matter of Example 6 and further includes consulting, by the translation agent, a host permission table (HPT) that associates a page permission entry with each physical page of a plurality of physical pages in the memory and each of a plurality of contexts of a plurality of devices coupled to the host system; and wherein said determining further comprises locating, by the translation agent, the page permission entry corresponding to the context of the device and the physical page within the HPT.

Example 8 includes the subject matter of Examples 6-7, wherein the HTP is organized as a multi-level hierarchical table.

Example 9 includes the subject matter of Examples 6-8, wherein the host-to-device link comprises a Peripheral Component Interconnect Express (PCIe) link and wherein said locating further comprises: identifying, by the translation agent, a base address of a top level of the multi-level hierarchical table based on a Bus/Device/Function identifier contained within the translated request; and walking, by the translation agent, the multi-level hierarchical table starting at the top level.

Example 10 includes the subject matter of Examples 6-9 and further includes responsive to said locating, storing, by the translation agent, at least a portion of the page permission entry within a dedicated HPT cache associated with the translation agent.

Example 11 includes the subject matter of Examples 6-10, wherein the translation agent comprises an Input/Output Memory Management Unit (IOMMU).

Example 12 includes the subject matter of Examples 6-11, wherein the device comprises a graphics processing unit (GPU).

Some embodiments pertain to Example 13 that includes a method of prefetching page access permissions associated with a translation request, the method comprising: maintaining on behalf of software of a host system, by a translation agent of the host system, a host permission table (HPT) that associates a page permission entry containing page access permissions with each physical page of a plurality of physical pages in a memory of the host system and each of a plurality of contexts of a plurality of devices coupled to the host system; receiving, by the translation agent, a translation request from a device of the plurality of devices via a host-to-device link, wherein the translation request specifies a virtual address to be translated to a physical address within the memory and is associated with a context of the device; translating, by the translation agent, the virtual address to the physical address; and using, by the translation agent, the translation request as a hint the device will soon request a memory operation involving the physical address and avoiding a future HPT cache miss by proactively retrieving a page permission entry from the HPT corresponding to the context of the device and a physical page in which the physical address resides and storing at least a portion of the page permission entry within the HPT cache.

Example 14 includes the subject matter of Example 13, wherein the HPT is organized as a multi-level hierarchical table.

Example 15 includes the subject matter of Examples 13-14, wherein the host-to-device link comprises a Peripheral Component Interconnect Express (PCIe) link and wherein said retrieving further comprises: identifying, by the translation agent, a base address of a top level of the multi-level hierarchical table based on a bus/device/function descriptor contained within the translation request; and locating, by the translation agent, the page permission entry within the HPT by walking the multi-level hierarchical table starting at the top level.

Example 16 includes the subject matter of Examples 13-15, wherein the HPT cache includes a separate cache for each level of the multi-level hierarchical table.

Example 17 includes the subject matter of Examples 13-16, wherein the HPT cache includes a dedicated cache for a lowest level of the multi-level hierarchical table and a shared cache for all other levels of the multi-level hierarchical table.

Some embodiments pertain to Example 18 that includes a method of facilitating dynamic building of a host permission table (HPT), the method comprising: maintaining on behalf of software running on a host system, by a translation agent of the host system, a host permission table (HPT) that associates a page permission entry containing page access permissions with each physical page of a plurality of physical pages in a memory of the host system and each of a plurality of contexts of a plurality of devices coupled to the host system; receiving, by the translation agent, a translation request from a device of the plurality of devices via a host-to-device link, wherein the translation request specifies a virtual address to be translated to a physical address within the memory; and facilitating dynamic building of the HPT by system software running on the host system, by the translation agent, by: proactively retrieving page access permissions from the HPT corresponding to the context of the device and a physical page in which the physical address resides; proactively retrieving page table permissions for the context of the device corresponding to the physical page; and communicating to the device the least possible privileges represented by the combination of the retrieved page access permissions and the retrieved page table permissions.

Example 19 includes the subject matter of Example 18, wherein the HPT is organized as a multi-level hierarchical table.

Example 20 includes the subject matter of Examples 18-19, wherein the host-to-device link comprises a Peripheral Component Interconnect Express (PCIe) interface or a cache-coherent interface.

Some embodiments pertain to Example 21 that includes one or more non-transitory computer-readable storage mediums having stored thereon executable computer program instructions that, when executed by one or more processors, cause the one or more processors to perform operations including: receiving, by a translation agent of a host system, a translated request from a device via a host-to-device link, wherein the translated request specifies a memory operation and a physical address within a memory of the host system associated with the memory operation; determining, by the translation agent, page access permissions assigned to a context of the device for a physical page of the memory within which the physical address resides; when the page access permissions permit the memory operation, then allowing, by the translation agent, the memory operation to proceed; and when the page access permissions do not permit the memory operation, then blocking, by the translation agent, the memory operation.

Example 22 includes the subject matter of Example 21, wherein the operations further include consulting, by the translation agent, a host permission table (HPT) that associates a page permission entry with each physical page of a plurality of physical pages in the memory and each of a plurality of contexts of a plurality of devices coupled to the host system; and wherein said determining further comprises locating, by the translation agent, the page permission entry corresponding to the context of the device and the physical page within the HPT.

Example 23 includes the subject matter of Examples 21-22, wherein the HTP is organized as a multi-level hierarchical table.

Example 24 includes the subject matter of Examples 21-23, wherein the host-to-device link comprises a Peripheral Component Interconnect Express (PCIe) link and wherein said locating further comprises: identifying, by the translation agent, a base address of a top level of the multi-level hierarchical table based on a Bus/Device/Function identifier contained within the translated request; and walking, by the translation agent, the multi-level hierarchical table starting at the top level.

Example 25 includes the subject matter of Examples 21-24, wherein the operations further include responsive to said locating, storing, by the translation agent, at least a portion of the page permission entry within a dedicated HPT cache associated with the translation agent.

Example 26 includes the subject matter of Examples 21-25, wherein the translation agent comprises an Input/Output Memory Management Unit (IOMMU).

Example 27 includes the subject matter of Examples 21-26, wherein the device comprises a graphics processing unit (GPU).

Some embodiments pertain to Example 28 that includes one or more non-transitory computer-readable storage mediums having stored thereon executable computer program instructions that, when executed by one or more processors, cause the one or more processors to perform operations including: maintaining on behalf of software of a host system, by a translation agent of the host system, a host permission table (HPT) that associates a page permission entry containing page access permissions with each physical page of a plurality of physical pages in a memory of the host system and each of a plurality of contexts of a plurality of devices coupled to the host system; receiving, by the translation agent, a translation request from a device of the plurality of devices via a host-to-device link, wherein the translation request specifies a virtual address to be translated to a physical address within the memory and is associated with a context of the device; translating, by the translation agent, the virtual address to the physical address; and using, by the translation agent, the translation request as a hint the device will soon request a memory operation involving the physical address and avoiding a future HPT cache miss by proactively retrieving a page permission entry from the HPT corresponding to the context of the device and a physical page in which the physical address resides and storing at least a portion of the page permission entry within the HPT cache.

Example 29 includes the subject matter of Example 13, wherein the HPT is organized as a multi-level hierarchical table.

Example 30 includes the subject matter of Examples 28-29, wherein the host-to-device link comprises a Peripheral Component Interconnect Express (PCIe) link and wherein said retrieving further comprises: identifying, by the translation agent, a base address of a top level of the multi-level hierarchical table based on a bus/device/function descriptor contained within the translation request; and locating, by the translation agent, the page permission entry within the HPT by walking the multi-level hierarchical table starting at the top level.

Example 31 includes the subject matter of Examples 28-30, wherein the HPT cache includes a separate cache for each level of the multi-level hierarchical table.

Example 32 includes the subject matter of Examples 28-31, wherein the HPT cache includes a dedicated cache for a lowest level of the multi-level hierarchical table and a shared cache for all other levels of the multi-level hierarchical table.

Some embodiments pertain to Example 33 that includes one or more non-transitory computer-readable storage mediums having stored thereon executable computer program instructions that, when executed by one or more processors, cause the one or more processors to perform operations including: maintaining on behalf of software running on a host system, by a translation agent of the host system, a host permission table (HPT) that associates a page permission entry containing page access permissions with each physical page of a plurality of physical pages in a memory of the host system and each of a plurality of contexts of a plurality of devices coupled to the host system; receiving, by the translation agent, a translation request from a device of the plurality of devices via a host-to-device link, wherein the translation request specifies a virtual address to be translated to a physical address within the memory; and facilitating dynamic building of the HPT by system software running on the host system, by the translation agent, by: proactively retrieving page access permissions from the HPT corresponding to the context of the device and a physical page in which the physical address resides; proactively retrieving page table permissions for the context of the device corresponding to the physical page; and communicating to the device the least possible privileges represented by the combination of the retrieved page access permissions and the retrieved page table permissions.

Example 34 includes the subject matter of Example 33, wherein the HPT is organized as a multi-level hierarchical table.

Example 35 includes the subject matter of Examples 33-34, wherein the host-to-device link comprises a Peripheral Component Interconnect Express (PCIe) interface or a cache-coherent interface.

Some embodiments pertain to Example 36 that includes a system for determining access permissions for a translated request comprising: a means for receiving a translated request from a device via a host-to-device link, wherein the translated request specifies a memory operation and a physical address within a memory of a host system associated with the memory operation; a means for determining page access permissions assigned to a context of the device for a physical page of the memory within which the physical address resides; a means for allowing the memory operation to proceed when the page access permissions permit the memory operation; and a means for blocking the memory operation when the page access permissions do not permit the memory operation.

Example 37 includes the subject matter of Example 36 and further includes a means for consulting a host permission table (HPT) that associates a page permission entry with each physical page of a plurality of physical pages in the memory and each of a plurality of contexts of a plurality of devices coupled to the host system; and wherein the means for determining is further for locating the page permission entry corresponding to the context of the device and the physical page within the HPT.

Example 38 includes the subject matter of Examples 36-37, wherein the HTP is organized as a multi-level hierarchical table.

Example 39 includes the subject matter of Examples 36-38, wherein the host-to-device link comprises a Peripheral Component Interconnect Express (PCIe) link and wherein said locating further comprises: identifying, by the translation agent, a base address of a top level of the multi-level hierarchical table based on a Bus/Device/Function identifier contained within the translated request; and walking, by the translation agent, the multi-level hierarchical table starting at the top level.

Example 40 includes the subject matter of Examples 36-39 and further includes a means, responsive to said locating, for storing at least a portion of the page permission entry within a dedicated HPT cache associated with the translation agent.

Example 41 includes the subject matter of Examples 36-40, wherein one or more of the means include an Input/Output Memory Management Unit (IOMMU).

Example 42 includes the subject matter of Examples 36-41, wherein the device comprises a graphics processing unit (GPU).

Some embodiments pertain to Example 43 that includes a system for prefetching page access permissions associated with a translation request comprising: a means for maintaining a host permission table (HPT) that associates a page permission entry containing page access permissions with each physical page of a plurality of physical pages in a memory of a host system and each of a plurality of contexts of a plurality of devices coupled to the host system; a means for receiving a translation request from a device of the plurality of devices via a host-to-device link, wherein the translation request specifies a virtual address to be translated to a physical address within the memory and is associated with a context of the device; a means for translating the virtual address to the physical address; and a means for using the translation request as a hint the device will soon request a memory operation involving the physical address and avoiding a future HPT cache miss by proactively retrieving a page permission entry from the HPT corresponding to the context of the device and a physical page in which the physical address resides and storing at least a portion of the page permission entry within the HPT cache.

Example 44 includes the subject matter of Example 43, wherein the HPT is organized as a multi-level hierarchical table.

Example 45 includes the subject matter of Examples 43-44, wherein the host-to-device link comprises a Peripheral Component Interconnect Express (PCIe) link and wherein said retrieving further comprises: identifying, by the translation agent, a base address of a top level of the multi-level hierarchical table based on a bus/device/function descriptor contained within the translation request; and locating, by the translation agent, the page permission entry within the HPT by walking the multi-level hierarchical table starting at the top level.

Example 46 includes the subject matter of Examples 43-45, wherein the HPT cache includes a separate cache for each level of the multi-level hierarchical table.

Example 47 includes the subject matter of Examples 43-46, wherein the HPT cache includes a dedicated cache for a lowest level of the multi-level hierarchical table and a shared cache for all other levels of the multi-level hierarchical table.

Some embodiments pertain to Example 48 that includes a system for facilitating dynamic building of a host permission table (HPT), the system comprising: a means for maintaining on behalf of software running on a host system a host permission table (HPT) that associates a page permission entry containing page access permissions with each physical page of a plurality of physical pages in a memory of the host system and each of a plurality of contexts of a plurality of devices coupled to the host system; a means for receiving a translation request from a device of the plurality of devices via a host-to-device link, wherein the translation request specifies a virtual address to be translated to a physical address within the memory; and a means for facilitating dynamic building of the HPT by system software running on the host system by: proactively retrieving page access permissions from the HPT corresponding to the context of the device and a physical page in which the physical address resides; proactively retrieving page table permissions for the context of the device corresponding to the physical page; and communicating to the device the least possible privileges represented by the combination of the retrieved page access permissions and the retrieved page table permissions.

Example 49 includes the subject matter of Example 48, wherein the HPT is organized as a multi-level hierarchical table.

Example 50 includes the subject matter of Examples 48-49, wherein the host-to-device link comprises a Peripheral Component Interconnect Express (PCIe) interface or a cache-coherent interface.

Some embodiments pertain to Example 51 that includes an apparatus that implements or performs a method of any of Examples 6-12.

Some embodiments pertain to Example 52 that includes an apparatus that implements or performs a method of any of Examples 13-17.

Some embodiments pertain to Example 53 that includes an apparatus that implements or performs a method of any of Examples 18-20.

Example 54 includes at least one machine-readable medium comprising a plurality of instructions, when executed on a computing device, to implement or perform a method or realize an apparatus as described in any preceding Example.

Example 55 includes an apparatus comprising means for performing a method as claimed in any of Examples 6-12.

Example 56 includes an apparatus comprising means for performing a method as claimed in any of Examples 13-17.

Example 57 includes an apparatus comprising means for performing a method as claimed in any of Examples 18-20.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A system comprising:
   a memory operable to store data;
   an Input/Output Memory Management Unit (IOMMU) coupled to the memory; and
   a host-to-device link coupling the IOMMU with one or more devices, wherein the IOMMU is operable as a translation agent on behalf of the one or more devices in connection with memory operations relating to the memory, including:
   maintaining, by the IOMMU, a host permission table (HPT) that associates a page permission entry with each physical page of a plurality of physical pages of the memory and one or more contexts of the one or more devices on a per-bus, per-device, per-port, per-function, or per-process basis;
   receiving a translated request from a discrete device of the one or more devices via the host-to-device link, wherein the translated request specifies a memory operation and a physical address within the memory pertaining to the memory operation;
   determining page access permissions assigned to a context of the discrete device for a physical page of the memory within which the physical address resides by locating the page permission entry corresponding to the context of the discrete device and the physical page within the HPT;
   allowing the memory operation to proceed when the page access permissions permit the memory operation; and
   blocking the memory operation when the page access permissions do not permit the memory operation.

2. The system of claim 1, wherein the HPT is organized as a multi-level hierarchical table.

3. The system of claim 2, further comprising an HPT cache including a separate cache for each level of the multi-level hierarchical table.

4. The system of claim 2, further comprising an HPT cache including a dedicated cache for a lowest level of the multi-level hierarchical table and a shared cache for all other levels of the multi-level hierarchical table.

5. The system of claim 1, wherein the host-to-device link comprises a Peripheral Component Interconnect Express (PCIe) interface or a cache-coherent interface.

6. The system of claim 1, wherein the discrete device comprises a graphics processing unit (GPU).

7. The system of claim 1, wherein the context is determined based on a Bus/Device/Function descriptor contained within the translated request.

8. The system of claim 1, wherein the page access permissions are maintained at a plurality of resolutions for a given physical page of the plurality of pages.

9. The system of claim 8, wherein each resolution of the plurality of resolutions comprises one or more of a device-level resolution, a bus-level resolution, a port-level resolution, and a process-level resolution.

10. A method comprising:
    maintaining, by a translation agent of a host system, a host permission table (HPT) that associates a page permission entry with each physical page of a plurality of physical pages of a memory of the host system and one or more contexts of one or more devices coupled to the host system on a per-bus, per-device, per-port, per-function, or per-process basis;
    receiving, by the translation agent, a translated request from a device of the one or more devices via a host-to-device link, wherein the translated request specifies a memory operation and a physical address within a memory of the host system associated with the memory operation;
    determining, by the translation agent, page access permissions assigned to a context of the device for a physical page of the memory within which the physical address resides by locating the page permission entry corresponding to the context of the device and the physical page within the HPT;
    when the page access permissions permit the memory operation, then allowing, by the translation agent, the memory operation to proceed; and
    when the page access permissions do not permit the memory operation, then blocking, by the translation agent, the memory operation.

11. The method of claim 10, wherein the HPT is organized as a multi-level hierarchical table.

12. The method of claim 11, wherein the host-to-device link comprises a Peripheral Component Interconnect Express (PCIe) link and wherein said locating further comprises:
    identifying, by the translation agent, a base address of a top level of the multi-level hierarchical table based on a Bus/Device/Function identifier contained within the translated request; and
    walking, by the translation agent, the multi-level hierarchical table starting at the top level.

13. The method of claim 10, further comprising responsive to said locating, storing, by the translation agent, at least a portion of the page permission entry within a dedicated HPT cache associated with the translation agent.

14. The method of claim 13, wherein the device comprises a graphics processing unit (GPU).

15. The method of claim 10, wherein the translation agent comprises an Input/Output Memory Management Unit (IOMMU).

16. The method of claim 10, further comprising determining, by the translation agent, the context based on a Bus/Device/Function descriptor contained within the translated request.

17. The method of claim 10, wherein the page access permissions are maintained at a plurality of resolutions for a given physical page of the plurality of pages.

18. The method of claim 17, wherein each resolution of the plurality of resolutions comprises one or more of a device-level resolution, a bus-level resolution, a port-level resolution, and a process-level resolution.

* * * * *